(12) United States Patent
Nadeau et al.

(10) Patent No.: US 9,982,809 B2
(45) Date of Patent: May 29, 2018

(54) COMPOSITE TUBING AND METHOD FOR MAKING AND USING SAME

(71) Applicant: SAINT-GOBAIN PERFORMANCE PLASTICS CORPORATION, Solon, OH (US)

(72) Inventors: Adam P. Nadeau, Boylston, MA (US); Jianfeng Zhang, Shrewsbury, MA (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 0 days. days.

(21) Appl. No.: 15/395,437

(22) Filed: Dec. 30, 2016

(65) Prior Publication Data

US 2017/0191586 A1   Jul. 6, 2017

Related U.S. Application Data

(60) Provisional application No. 62/273,114, filed on Dec. 30, 2015.

(51) Int. Cl.
*F16L 11/04* (2006.01)
*B29C 35/08* (2006.01)
(Continued)

(52) U.S. Cl.
CPC .......... *F16L 11/04* (2013.01); *B29C 35/0805* (2013.01); *B29C 47/0023* (2013.01);
(Continued)

(58) Field of Classification Search
CPC .. F16L 11/04; B29C 35/0805; B29C 47/0004; B29C 47/0023; B29C 47/065; B29C 2035/0827; B29C 35/0866; B29C 35/10; B29C 2035/0833; B29C 2035/0822; B29C 2035/085; B29C 2035/0877;
(Continued)

(56) References Cited

U.S. PATENT DOCUMENTS

| 508,287 | A | 11/1893 | Cunningham |
| 3,313,773 | A | 4/1967 | Lamoreaux |

(Continued)

FOREIGN PATENT DOCUMENTS

| EP | 146307 A2 | 6/1985 |
| EP | 0249336 A2 | 12/1987 |

(Continued)

OTHER PUBLICATIONS

Sepe, M.P. Thermal Analysis of Polymers. Shawbury, Shewsbury, Shropshire, UK: Rapra Technology, 1997, pages 30-32.
(Continued)

*Primary Examiner* — Michael C Miggins
(74) *Attorney, Agent, or Firm* — Abel Law Group, LLP; Chi Suk Kim

(57) ABSTRACT

A composite tube includes an inner layer including a silicone polymer, wherein the inner layer has a surface that defines a central lumen of the composite tube; an adhesive layer adjacent to the inner layer, wherein the adhesive layer includes an adhesive silicone material including a silicone polymer and an adhesion promoter, and an outer layer adjacent to the adhesive layer, wherein the outer layer includes a thermoplastic polymer having a functional group that forms a chemical bond with the adhesion promoter of the adhesive silicone material.

20 Claims, 2 Drawing Sheets

(51) Int. Cl.

| | | |
|---|---|---|
| *B29C 47/06* | (2006.01) | |
| *B32B 1/08* | (2006.01) | |
| *B32B 7/12* | (2006.01) | |
| *B32B 27/28* | (2006.01) | |
| *C09J 119/00* | (2006.01) | |
| *B29C 47/00* | (2006.01) | |
| *B29K 83/00* | (2006.01) | |
| *B29K 101/12* | (2006.01) | |
| *B29K 105/00* | (2006.01) | |
| *B29K 105/24* | (2006.01) | |
| *B29C 35/10* | (2006.01) | |

(52) U.S. Cl.
CPC .............. *B29C 47/065* (2013.01); *B32B 1/08* (2013.01); *B32B 7/12* (2013.01); *B32B 27/283* (2013.01); *C09J 119/00* (2013.01); *B29C 35/0866* (2013.01); *B29C 35/10* (2013.01); *B29C 47/0004* (2013.01); *B29C 2035/085* (2013.01); *B29C 2035/0822* (2013.01); *B29C 2035/0827* (2013.01); *B29C 2035/0833* (2013.01); *B29C 2035/0877* (2013.01); *B29K 2083/00* (2013.01); *B29K 2101/12* (2013.01); *B29K 2105/0097* (2013.01); *B29K 2105/24* (2013.01)

(58) Field of Classification Search
CPC ............ B29K 2083/00; B29K 2101/12; B29K 2105/0097; B29K 2105/24; B32B 1/08; B32B 7/12; B32B 27/283; C09J 119/00
See application file for complete search history.

(56) References Cited

U.S. PATENT DOCUMENTS

| | | | |
|---|---|---|---|
| 4,288,345 | A | 9/1981 | Ashby et al. |
| 4,503,160 | A | 3/1985 | Williams, Jr. |
| 4,504,645 | A | 3/1985 | Melancon |
| 4,510,094 | A | 4/1985 | Drahnak |
| 4,530,879 | A | 7/1985 | Drahnak |
| 4,558,147 | A | 12/1985 | Eckberg et al. |
| 4,579,636 | A | 4/1986 | Inoue et al. |
| 4,587,137 | A | 5/1986 | Eckberg |
| 4,600,484 | A | 8/1986 | Drahnak |
| 4,699,802 | A | 10/1987 | Nakos et al. |
| 4,861,621 | A | 8/1989 | Kanzaki |
| 4,916,169 | A | 4/1990 | Boardman et al. |
| 5,260,348 | A | 11/1993 | Shepherd et al. |
| 5,346,932 | A | 9/1994 | Takahashi et al. |
| 5,418,065 | A | 5/1995 | Fujiki et al. |
| 5,485,541 | A | 1/1996 | Bigley, Jr. et al. |
| 5,534,609 | A | 7/1996 | Lewis et al. |
| 5,552,466 | A | 9/1996 | Beckley et al. |
| 5,904,887 | A | 5/1999 | Nakamura et al. |
| 5,965,170 | A | 10/1999 | Matsuoka et al. |
| 6,194,508 | B1 | 2/2001 | Achenbach et al. |
| 6,908,682 | B2 | 6/2005 | Mistele |
| 7,314,590 | B2 | 1/2008 | Yeager |
| 7,399,919 | B2 | 7/2008 | McCutcheon et al. |
| 7,511,110 | B2 | 3/2009 | Fehn |
| 7,790,094 | B2 | 9/2010 | Lim et al. |
| 7,858,197 | B2 | 12/2010 | Ahn et al. |
| 8,652,377 | B2 | 2/2014 | Van Meerbeek et al. |
| 8,652,624 | B2 | 2/2014 | Subramanian et al. |
| 9,017,312 | B2 | 4/2015 | Lee et al. |
| 2002/0016412 | A1 | 2/2002 | Hirai et al. |
| 2002/0043330 | A1 | 4/2002 | Stripe |
| 2003/0197296 | A1 | 10/2003 | Krassilnikov |
| 2004/0238994 | A1 | 12/2004 | Wang |
| 2004/0245677 | A1 | 12/2004 | Marple et al. |
| 2007/0077360 | A1 | 4/2007 | Kashiwagi et al. |
| 2008/0033071 | A1 | 2/2008 | Irmer et al. |
| 2008/0128955 | A1 | 6/2008 | Lim et al. |
| 2008/0166509 | A1 | 7/2008 | Simon et al. |
| 2008/0221232 | A1 | 9/2008 | Ou et al. |
| 2008/0282542 | A1 | 11/2008 | McCutcheon et al. |
| 2009/0062417 | A1 | 3/2009 | Wrobel et al. |
| 2009/0162664 | A1 | 6/2009 | Ou |
| 2009/0200697 | A1 | 8/2009 | Aulick |
| 2009/0226739 | A1 | 9/2009 | Pinto et al. |
| 2010/0021737 | A1 | 1/2010 | Beck et al. |
| 2010/0168309 | A1 | 7/2010 | Mackinnon |
| 2010/0323105 | A1 | 12/2010 | Hosoe |
| 2011/0068512 | A1 | 3/2011 | DeCato et al. |
| 2011/0115132 | A1 | 5/2011 | Burdy et al. |
| 2011/0133366 | A1 | 6/2011 | Lim et al. |
| 2012/0006443 | A1 | 1/2012 | Bentley |
| 2012/0027970 | A1 | 2/2012 | Irmer et al. |
| 2013/0062818 | A1 | 3/2013 | DeCato et al. |
| 2014/0050871 | A1 | 2/2014 | Zhu et al. |
| 2015/0091218 | A1 | 4/2015 | Serebrennikov et al. |

FOREIGN PATENT DOCUMENTS

| | | |
|---|---|---|
| EP | 122008 B1 | 6/1988 |
| EP | 355991 A2 | 2/1990 |
| EP | 398701 A3 | 4/1992 |
| EP | 0704492 A2 | 4/1996 |
| EP | 0767216 A1 | 4/1997 |
| EP | 851000 A2 | 7/1998 |
| EP | 1484148 A1 | 12/2004 |
| JP | 64-40767 A | 2/1989 |
| JP | H3221561 A | 9/1991 |
| JP | H0847943 A | 2/1996 |
| JP | H09012650 A | 1/1997 |
| JP | 2000088153 A | 3/2000 |
| JP | 2001342347 A | 12/2001 |
| JP | 2003205537 A | 7/2003 |
| JP | 2005001339 A | 1/2005 |
| JP | 2005138557 A | 6/2006 |
| JP | 2006169537 A | 6/2006 |
| JP | 2007112025 A | 5/2007 |
| JP | 2008170534 A | 7/2008 |
| JP | 2008183762 A | 8/2008 |
| JP | 2010110894 A | 5/2010 |
| JP | 2010515806 A | 5/2010 |
| JP | 2010529258 A | 8/2010 |
| JP | 2010537018 A | 12/2010 |
| JP | 2012071555 A | 4/2012 |
| JP | 2013519547 A | 5/2013 |
| WO | 196487 A2 | 12/2001 |
| WO | 2010040243 A1 | 4/2010 |
| WO | 2014028625 A1 | 2/2014 |
| WO | 2015048483 A1 | 4/2015 |

OTHER PUBLICATIONS

Ray, P. 2011. Polymer Cross-Linkling. Encyclopedia of Polymer Science and Technology, p. 2, lines 10-11.
International Search Report from PCT/US2016/026447 dated Apr. 7, 2017, 1 pg.

COMPOSITE TUBING AND METHOD FOR MAKING AND USING SAME

CROSS-REFERENCE TO RELATED APPLICATION(S)

This application claims priority under 35 U.S.C. § 119(e) to U.S. Patent Application No. 62/273,114 entitled "COMPOSITE TUBING AND METHOD FOR MAKING AND USING SAME," by Adam P. NADEAU, filed Dec. 30, 2015, which is assigned to the current assignee hereof and incorporated herein by reference in its entirety.

FIELD OF THE DISCLOSURE

The disclosure, generally, is related to a composite tube and method of forming the composite tube.

BACKGROUND

Many industries utilize silicone tubing for the delivery and removal of fluids because silicone tubing is non-toxic, flexible, thermally stable, has low chemical reactivity, and can be produced in a variety of sizes when compared with tubing made from other materials. For example, silicone tubing may be used in a variety of industries such as the medical industry, pharmaceutical industry, food delivery, and the like. However, silicone tubing is limited due to its undesirable permeation rates attributed to air ingress in the fluid path and evaporation of solutions in the fluid path. As such, thermoplastic elastomers are desirable for their permeation rates, low coefficient of friction, and low tack, however, thermoplastic elastomers are not ideal for processing or performance.

Composite tubing is a multiple layer tubing system. Composite tubing is desirable with a silicone material as one of the layers; however, composite tubing is typically formed by heat curing silicone materials at an elevated temperature. For instance, temperatures in excess of at least 150° C., such as at least 160° C., such as at least 170° C., or even up to or greater than 200° C., are used for the heat cure. Due to the elevated temperature needed for heat cure, silicone materials have typically been commercially used with high melt temperature substrates for multiple layer articles. These multiple layer articles are typically expensive since they are limited to high melt temperature substrates. Unfortunately, adhesion between dissimilar materials such as silicone materials and thermoplastic materials can also be problematic.

Accordingly, an improved composite tube and method to form a multiple layer composite tube are desired.

SUMMARY

In an embodiment, a composite tube includes an inner layer including a silicone polymer, wherein the inner layer has a surface that defines a central lumen of the composite tube; an adhesive layer adjacent to the inner layer, wherein the adhesive layer includes an adhesive silicone material including a silicone polymer and an adhesion promoter, and an outer layer adjacent to the adhesive layer, wherein the outer layer includes a thermoplastic polymer having a functional group that forms a chemical bond with the adhesion promoter of the adhesive silicone material.

In another embodiment, a method of forming a composite tube includes providing an inner layer including a silicone polymer, wherein the inner layer has a surface that defines a central lumen of the composite tube; extruding an adhesive layer adjacent to the inner layer, wherein the adhesive layer includes an adhesive silicone material including a silicone polymer and an adhesion promoter; extruding an outer layer adjacent to the adhesive layer, wherein the outer layer includes a thermoplastic polymer having a functional group that forms a chemical bond with the adhesion promoter of the adhesive silicone material; and irradiating the adhesive layer and the outer layer with a radiation source to form the chemical bond between the functional group of the outer layer and the adhesion promoter of the adhesive silicone material.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
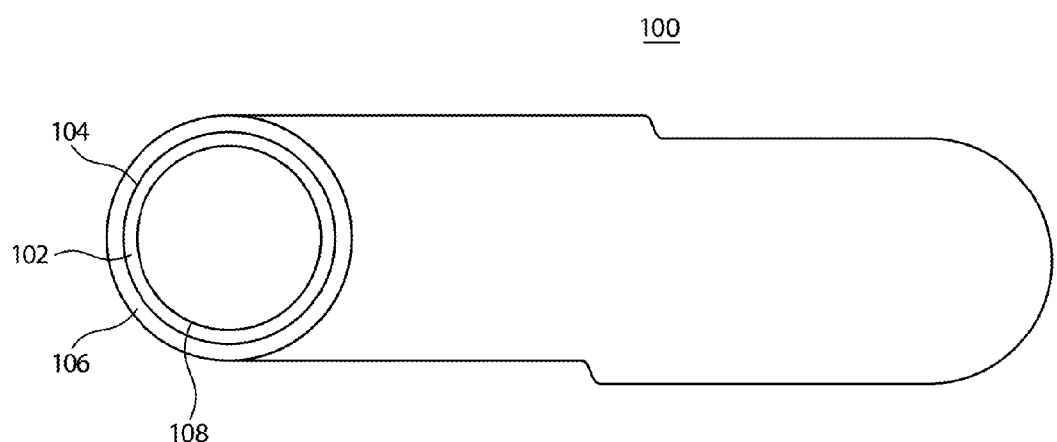
FIG. 1 includes an illustration of an exemplary composite tube.

The following description in combination with the figures is provided to assist in understanding the teachings disclosed herein. The following discussion focuses on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having" or any other variation thereof, are open-ended terms and should be interpreted to mean "including, but not limited to . . . ." These terms encompass the more restrictive terms "consisting essentially of" and "consisting of." In an embodiment, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in reference books and other sources within the structural arts and corresponding manufacturing arts. Unless indicated otherwise, all measurements are at about 25° C. For instance, values for viscosity are at 25° C., unless indicated otherwise.

The disclosure generally relates to composite tubing, and in particular, to composite tubing including an inner layer, an adhesive layer, and an outer layer. The inner layer includes a silicone polymer. The adhesive layer is adjacent to the inner layer and includes an adhesive silicone material. The adhesive silicone material includes a silicone polymer and an adhesion promoter. The composite tube further includes an outer layer adjacent to the adhesive layer, wherein the outer layer includes a thermoplastic polymer having a functional group that form a chemical bond with the adhesion promoter of the adhesive silicone material. In an embodiment, a composite tube can include a hollow body having an inner bore. In a particular embodiment, the inner layer has a surface that defines a central lumen of the composite tube.

In an embodiment, the inner layer includes a silicone polymer. Any reasonable silicone polymer is envisioned. The silicone polymer may, for example, include a polyalkylsiloxane, such as a silicone polymer formed of a precursor, such as dimethylsiloxane, diethylsiloxane, dipropylsiloxane, methylethylsiloxane, methylpropylsiloxane, or combinations thereof. In a particular embodiment, the polyalkylsiloxane includes a polydialkylsiloxane, such as polydimethylsiloxane (PDMS). In a particular embodiment, the polyalkylsiloxane is a silicone hydride-containing polyalkylsiloxane, such as a silicone hydride-containing polydimethylsiloxane. In a further embodiment, the polyalkylsiloxane is a vinyl-containing polyalkylsiloxane, such as a vinyl-containing polydimethylsiloxane. In yet another embodiment, the silicone polymer is a combination of a hydride-containing polyalkylsiloxane and a vinyl-containing polyalkylsiloxane, such as a combination of hydride-containing polydimethylsiloxane and a vinyl-containing polydimethylsiloxane. In an example, the silicone polymer is non-polar and is free of halide functional groups, such as chlorine and fluorine, and of phenyl functional groups. Alternatively, the silicone polymer may include halide functional groups or phenyl functional groups. For example, the silicone polymer may include fluorosilicone or phenylsilicone.

The silicone polymer may further include any reasonable additive, either singly or in combination, such as a catalyst, a vinyl polymer, a hydride, an adhesion promoter, a filler, an initiator, an inhibitor, a colorant, a pigment, a carrier material, or any combination thereof. In an embodiment, the silicone polymer is a heat, i.e. thermally, cured material and includes a heat-activated catalyst. Any heat-activated catalyst is envisioned. For instance, an exemplary heat-activated catalyst is a peroxide, an organometallic complex compound of a transition metal, or combination thereof. In an embodiment, the catalyst includes platinum, rhodium, ruthenium, the like, or combinations thereof. In an embodiment, the catalyst is platinum-based. In an embodiment, the material content of the inner silicone layer is essentially 100% silicone material. In some embodiments, the inner silicone layer consists essentially of the respective silicone polymer described above. As used herein, the phrase "consists essentially of" used in connection with the silicone polymer precludes the presence of non-silicone polymers that affect the basic and novel characteristics of the silicone polymer, although, commonly used processing agents and additives may be used in the silicone polymer.

In a particular embodiment, the inner silicone layer may include a conventional, commercially prepared silicone polymer. In a particular embodiment, the conventional, commercially prepared silicone polymer is a conventional heat cured silicone polymer. "Conventional heat cure" as used herein refers to curing via heat at a temperature greater than about 150° C. The commercially prepared silicone polymer typically includes components such as the non-polar silicone polymer, the catalyst, a filler, and optional additives. Any reasonable filler and additives are envisioned. In an embodiment, the silicone polymer of the inner layer is substantially free of additives such as, for example, adhesion promoters. "Substantially free" as used herein refers to less than about 0.1% by weight of any adhesion promoter, based on the total weight of the silicone polymer of the inner layer. Commercially available silicone polymers include, for example, a high consistency gum rubber (HCR), a liquid silicone rubber (LSR), or a room temperature vulcanizing silicone (RTV). In a particular embodiment, the inner layer may be a silicone polymer that has been commercialized, validated, and approved for a specific use. In an embodiment, the inner layer silicone polymer has been validated for regulatory approval by the food and drug administration (FDA), United Stated Pharmacopeia (USP), European Pharmacopeia (EP), International Standards Organization (ISO), other regulatory approvals, or combination thereof. For instance, the inner layer silicone polymer has been validated using a USP Class VI standard, ISO 10993 standard, and the like.

In an embodiment, the inner layer silicone polymer has a viscosity of up to about 100,000,000 centipoise (cPs), such as about 50,000 centipoise to about 100,000,000 cPs, such as about 50,000 cPs to about 5,000,000 cPs. In a particular embodiment, the inner layer silicone polymer includes a liquid silicone rubber. The liquid silicone rubber typically has a viscosity prior to cure of less than about 2,000,000 cPs, such as about 50,000 cPs to about 2,000,000 cPs, such as about 200,000 cPs to about 1,000,000 cPs, such as about 500,000 cPs to about 800,000 cPs. In a particular embodiment, the inner layer silicone polymer includes a high consistency gum rubber. The high consistency gum rubber typically has a viscosity prior to cure of greater than about 2,000,000 cPs, such as about 2,000,000 cPs to about 100,000,000 cPs, such as about 2,000,000 cPs to about 10,000,000 cPs, such as about 5,000,000 cPs to about 10,000,000 cPs. It will be appreciated that the viscosity of the inner layer silicone polymer can include a silicone polymer having a viscosity within a range between any of the minimum and maximum values noted above.

In an embodiment, the adhesive layer of the composite tube includes an adhesive silicone material. In a more particular embodiment, the adhesive silicone material is an extruded silicone material or a molded material. In an even more particular embodiment, the adhesive silicone material is cured via a radiation source, a thermal source, or combination thereof. The source of radiation energy can include any reasonable radiation energy source such as actinic radiation. In a particular embodiment, the radiation source is ultraviolet light. Any reasonable wavelength of ultraviolet light is envisioned. In a specific embodiment, the ultraviolet light is at a wavelength of about 10 nanometers to about 500 nanometers, such as about 10 nanometers to about 410 nanometers. Further, any number of applications of radiation energy may be applied with the same or different wavelengths, depending upon the material and the desired result.

It will be appreciated that the wavelength can be within a range between any of the minimum and maximum values noted above.

The adhesive silicone material includes a silicone polymer and an adhesion promoter. The silicone polymer of the adhesive silicone material may, for example, include a polyalkylsiloxane, such as a silicone polymer formed of a precursor, such as dimethylsiloxane, diethylsiloxane, dipropylsiloxane, methylethylsiloxane, methylpropylsiloxane, or combinations thereof. In a particular embodiment, the polyalkylsiloxane includes a polydialkylsiloxane, such as polydimethylsiloxane (PDMS). In a particular embodiment, the polyalkylsiloxane is a silicone hydride-containing polyalkylsiloxane, such as a silicone hydride-containing polydimethylsiloxane. In a further embodiment, the polyalkylsiloxane is a vinyl-containing polyalkylsiloxane, such as a vinyl-containing polydimethylsiloxane. In yet another embodiment, the silicone polymer is a combination of a hydride-containing polyalkylsiloxane and a vinyl-containing polyalkylsiloxane, such as a combination of hydride-containing polydimethylsiloxane and a vinyl-containing polydimethylsiloxane. In an example, the silicone polymer is non-polar and is free of halide functional groups, such as chlorine and fluorine, and of phenyl functional groups. Alternatively, the silicone polymer may include halide functional groups or phenyl functional groups. For example, the silicone polymer may include fluorosilicone or phenylsilicone.

The adhesive silicone material further includes an adhesion promoter. Any reasonable adhesion promoter is envisioned such as a siloxane or silane, such as 3-methacryloxypropyltrimethoxysilane, 3-glycidoxypropyltrimethoxysilane, vinyl-tris(2-methoxyethoxy)-silane; 2,5,7,10-tetraoxa-6-silaundecane, 6-ethenyl-6-(2-methoxyethoxy)-silane, a hydrogen phenyl silicone, a phenyl silane, or any combination thereof. Any reasonable amount of adhesion promoter is envisioned. In an embodiment, the adhesion promoter is present at an amount of about 0.05 to about 5 weight %, based on the total weight of the adhesive silicone material.

The adhesive silicone material further includes a catalyst. Typically, the catalyst is present to initiate the crosslinking process. Any reasonable catalyst that can initiate crosslinking when exposed to a radiation source is envisioned. Typically, the catalyst is dependent upon the adhesive silicone material. In a particular embodiment, the catalytic reaction includes aliphatically unsaturated groups reacted with Si-bonded hydrogen in order to convert the addition-crosslinkable silicone material into the elastomeric state by formation of a network. In a more particular embodiment, the catalyst is activated by the radiation source and initiates the crosslinking process.

Any catalyst is envisioned depending upon the silicone polymer used in the adhesive silicone material, with the proviso that at least one catalyst can initiate crosslinking when exposed to the radiation source, such as ultraviolet radiation. In an embodiment, a hydrosilylation reaction catalyst may be used. For instance, an exemplary hydrosilylation catalyst is an organometallic complex compound of a transition metal. In an embodiment, the catalyst includes platinum, rhodium, ruthenium, the like, or combinations thereof. In a particular embodiment, the catalyst includes platinum. Further any reasonable optional catalyst may be used with the hydrosilylation catalyst. In an embodiment, the optional catalyst may or may not initiate crosslinking when exposed to a radiation source. Exemplary optional catalysts may include peroxide, tin, or combinations thereof. Alternatively, the adhesive silicone material further includes a peroxide catalyzed silicone material. In another example, the adhesive silicone material may be a combination of a platinum catalyzed and peroxide catalyzed silicone polymer. In an embodiment, the adhesive silicone material is substantially free of an optional catalyst, such as peroxide, tin, or combination thereof.

The adhesive silicone material may further include an additive. Any reasonable additive is envisioned. Exemplary additives may include, individually or in combination, a vinyl polymer, a hydride, a filler, an initiator, an inhibitor, a colorant, a pigment, a carrier material, or any combination thereof. In an embodiment, the vinyl polymer is an ethylene propylene diene elastomer such as vinyl norbornene (VNP), ethylidene norbornene (ENB), or combination thereof. In a particular embodiment, the vinyl polymer is present when the thermoplastic polymer of the outer layer is an ethylene propylene diene elastomer, further described below. In an embodiment, the adhesive silicone material consists essentially of the respective silicone polymer, adhesion promoter, and catalyst described above. In an embodiment, the adhesive silicone material consists essentially of the respective silicone polymer, adhesion promoter, inhibitor, catalyst, and vinyl polymer described above. As used herein, the phrase "consists essentially of" used in connection with the adhesive silicone material precludes the presence of non-silicone polymers that affect the basic and novel characteristics of the adhesive silicone material, although, commonly used processing agents and additives may be used in the adhesive silicone material.

In an embodiment, the adhesive silicone material includes a liquid silicone rubber (LSR), a room temperature vulcanizing silicone (RTV), a high consistency gum rubber (HCR), or a combination thereof. In an embodiment, the adhesive silicone material has a viscosity of up to about 100,000,000 centipoise (cPs), such as about 50,000 centipoise to about 100,000,000 cPs, such as about 50,000 cPs to about 5,000,000 cPs. In a particular embodiment, the adhesive silicone material includes a liquid silicone rubber. The liquid silicone rubber typically has a viscosity prior to cure of less than about 2,000,000 cPs, such as about 50,000 cPs to about 2,000,000 cPs, such as about 200,000 cPs to about 1,000,000 cPs, such as about 500,000 cPs to about 800,000 cPs. It will be appreciated that the viscosity of the adhesive silicone material can include a silicone polymer having a viscosity within a range between any of the minimum and maximum values noted above. In an embodiment, prior to cure, the adhesive silicone material has a viscosity that is less than the viscosity of the silicone polymer of the inner layer.

The adhesive silicone material may include a conventional, commercially prepared silicone polymer. The commercially prepared silicone material typically includes components such as the non-polar silicone polymer, a catalyst, a filler, and optional additives. Any reasonable filler and additives are envisioned. The catalyst that is initiated by the radiation source may be added separately or may be included within the commercially prepared formulation. The adhesion promoter may be added separately or may be included within the commercially prepared formulation. Particular embodiments of a commercially available liquid silicone rubber (LSR) include Momentive Silopren® UV LSR 2060, Wacker Elastosil® LR 3003/50 by Wacker Silicone of Adrian, Mich. and Rhodia Silbione® LSR 4340 by Rhodia Silicones of Ventura, Calif. In a particular embodiment, the silicone polymer of the inner layer is different than the adhesive silicone material of the adhesive layer. Although the silicone polymer of the inner layer is different than the adhesive silicone material of the adhesive layer, the adhesive silicone material forms a cohesive bond to the inner layer since both the inner layer and the adhesive layer include a silicone polymer. Further and as discussed below, the radiation exposure of the adhesive layer may provide desirable adhesion between the adhesive layer and the inner layer.

The composite tube further includes an outer layer. The outer layer includes a thermoplastic polymer having a functional group that forms a chemical bond with the adhesion promoter of the silicone polymer. Any reasonable thermoplastic polymer and functional group are envisioned. In an embodiment, the thermoplastic polymer has a desirable oxygen permeation rate and provides a desirable oxygen permeation rate to the final composite tube. In a particular embodiment, the thermoplastic polymer is a thermoplastic elastomer, a polyester, a polyurethane, a nylon, a polyimide, a polyamide, a polyether, a polystyrene, an acrylonitrile butadiene styrene (ABS), a polybutylene terephthalate (PBT), a polyacrylic, an ethylene vinyl alcohol (EVOH), a polyolefin, an ethylene propylene diene elastomer, a copolymer, a blend, or combination thereof. In a more particular embodiment, the thermoplastic polymer is a polyester, a polyester copolymer, or a thermoplastic polyurethane. In an embodiment, the thermoplastic polymer is an ethylene propylene diene elastomer including vinyl norbornene (VNP), ethylidene norbornene (ENB), or combination thereof.

The thermoplastic polymer further includes a functional group that forms a chemical bond with the adhesion promoter of the silicone polymer. "A functional group" as used herein refers to a chemical moiety that is covalently bonded to the thermoplastic polymer. Any functional group is envisioned that can form a bond with the adhesion promoter such as, for example, a hydroxide, a carbonyl, an alcohol, a carboxyl, a phenyl group, an amine, a diene, or combination thereof. In a particular embodiment, the functional group forms a cohesive bond with the adhesion promoter of the silicone polymer. Any amount of functional group on the thermoplastic polymer is envisioned to form a cohesive bond with the adhesion promoter. In an embodiment, the functional group is a portion of a backbone of the thermoplastic polymer, a pendant group off of the backbone of the thermoplastic polymer, or combination thereof. In an embodiment, the outer layer is substantially free of a silicone moiety.

The outer layer may be formed with any reasonable component such as any thermoplastic polymer precursor with the addition of any catalyst, any filler, any additive, any crosslink promoter, or combination thereof. The crosslink promoter may be triallyl cyanurate (TAC), triallyl isocyanurate (TAIC), or combination thereof. In an embodiment, the crosslink promoter may be a silane or siloxane, such as a hydrogen phenyl silicone, a phenyl silane, or combination thereof. In a more particular embodiment, the hydrogen phenyl silicone is used as a crosslink promoter when the outer layer is the ethylene propylene diene elastomer. In an embodiment, the crosslink promoter, catalyst, or combination thereof provides a functional group to the thermoplastic polymer. When present, any reasonable catalyst that can initiate crosslinking of the thermoplastic polymer is envisioned. In an embodiment, the catalyst is activated by a radiation source. In a particular embodiment, any reasonable catalyst that is activated by a radiation source is envisioned. In a more particular embodiment, the catalyst has a degradation temperature greater than the processing temperature (i.e. melt temperature) of the thermoplastic polymer such that the catalyst does not activate during the melting of the thermoplastic material. An exemplary catalyst is a peroxide. In a particular embodiment, the precursor, the catalyst, the filler, the additive, the crosslink promoter, or combination thereof are dependent upon the thermoplastic polymer chosen and final properties desired for the composite tube.

In an embodiment, the thermoplastic layer outer layer is an extruded thermoplastic layer. In an even more particular embodiment, the thermoplastic polymer is crosslinked via a radiation source. The source of radiation energy can include any reasonable radiation energy source such as actinic radiation, electron beam radiation, gamma radiation, or combination thereof. In a particular embodiment, the radiation source is ultraviolet light. Any reasonable wavelength of ultraviolet light is envisioned. In a specific embodiment, the ultraviolet light is at a wavelength of about 10 nanometers to about 500 nanometers, such as about 10 nanometers to about 410 nanometers. Further, any number of applications of radiation energy may be applied with the same or different wavelengths, depending upon the material and the desired result. It will be appreciated that the wavelength can be within a range between any of the minimum and maximum values noted above. Any gamma radiation source and dosage is envisioned. In an embodiment, the gamma radiation is via Cobalt-60 ($^{60}Co$) at a dose of about 10 kGy to about 200 kGy, such as about 20 kGy to about 100 kGy, such as about 50 kGy to about 100 kGy. It will be appreciated that the gamma radiation dose can be within a range between any of the minimum and maximum values noted above.

In an embodiment, the material content of the outer layer is essentially 100% thermoplastic polymer having the functional group. In some embodiments, the outer layer consists essentially of the respective thermoplastic polymer having the functional group described above. In an embodiment, the outer layer consists essentially of the respective thermoplastic polymer having the functional group and a catalyst as described. In an embodiment, the outer layer consists essentially of the thermoplastic polymer, a catalyst, and a crosslink promoter as described. As used herein, the phrase "consists essentially of" used in connection with the thermoplastic material precludes the presence of materials that affect the basic and novel characteristics of the thermoplastic polymer, although, commonly used processing agents and additives may be used in the thermoplastic polymer.

As illustrated in FIG. 1, a composite tube 100 is an elongated annular structure with a hollow central bore. The composite tube 100 includes an inner layer 102, an adhesive layer 104, and an outer layer 106. The inner layer 102 may be directly in contact with and may directly bond to the adhesive layer 104. For example, the inner layer 102 may directly bond to the adhesive layer 104 without intervening layers. In a particular embodiment, there is no primer layer between the inner layer 102 and the adhesive layer 104. Further, the adhesive layer 104 may be directly in contact with and may directly bond to the outer layer 106. For example, the adhesive layer 104 may directly bond to the outer layer 106 without intervening layers. In a particular embodiment, there is no primer layer between the adhesive layer 104 and the outer layer 106. In an exemplary embodiment, the composite tube 100 includes three layers, such as the inner layer 102, the adhesive layer 104, and the outer layer 106. As illustrated, the inner layer 102 includes an inner surface 108 that defines a central lumen of the tube.

Although illustrated as three layers, any number of layers is envisioned. For instance, the composite tube includes at least three layers, or even a greater number of layers. The number of layers is dependent upon the final properties desired for the composite tube. The composite tube may further include other layers. Other layers include, for example, a polymeric layer, a reinforcing layer, an adhesive layer, a barrier layer, a chemically resistant layer, a metal layer, any combination thereof, and the like. Any reasonable method of providing any additional layer is envisioned and is dependent upon the material chosen. Any thickness of the other layers may be envisioned. In an embodiment, the composite tube consists essentially of the inner layer, the adhesive layer, and the outer layer as described.

In an embodiment, the composite tube may be formed by any reasonable means and is dependent upon the material. In an example, the inner layer of the silicone polymer is provided by any reasonable means. In an exemplary embodiment, the inner layer of the silicone polymer is a commercially provided and validated tube. In an embodiment, the silicone polymer is formed extrusion or molding followed by conventional heat cure. In a particular embodiment, the inner layer is formed prior to the addition of the adhesive layer and the outer layer to form the composite tube.

After the inner layer, i.e. the silicone polymer, is provided, the inner layer may be surface treated on an outer surface that is adjacent to the adhesive silicone layer. In a particular embodiment, the outer surface of the inner layer is surface treated prior to forming the adhesive silicone layer over the inner layer. The surface treatment may be used to increase the adhesion of the inner layer to the adhesive silicone layer when the inner layer is in direct contact with the adhesive silicone layer. In a particular embodiment, the surface treatment enables enhanced adhesion between the two layers to provide cohesive bonding, i.e. cohesive failure occurs wherein the structural integrity of the inner layer and/or the adhesive silicone layer fails before the bond between the two materials fails. The surface treatment may include radiation treatment, chemical etch, physical-mechanical etch, plasma etch, corona treatment, chemical vapor deposition, or any combinations thereof.

Irradiating includes, for example, irradiating the outer surface of the inner layer with any ultraviolet energy sufficient to substantially increase the adhesion of the inner layer to the adhesive silicone layer, compared to a surface that has not been irradiated. In an embodiment, the ultraviolet energy is a wavelength of about 10 nanometers to about 500 nanometers, such as about 10 nanometers (nm) to about 410 nm. It will be appreciated that the wavelength can be within a range between any of the minimum and maximum values noted above.

In an embodiment, chemical etch includes sodium ammonia and sodium naphthalene. Physical-mechanical etch may include sandblasting and air abrasion. In another embodiment, plasma etching includes reactive plasmas such as hydrogen, oxygen, acetylene, methane, and mixtures thereof with nitrogen, argon, and helium. Corona treatment may include the reactive hydrocarbon vapors, such as acetone. In an embodiment, chemical vapor deposition includes the use of acrylates, vinylidene chloride, or acetone. In an embodiment, the outer surface of the inner layer is free of any surface treatment.

Typically, the adhesive layer is provided by any reasonable means such as extrusion or molding. In an embodiment, the adhesive layer, i.e. the adhesive silicone material, is formed by an extrusion system and extruded over the inner layer. In an embodiment, the adhesive layer is co-extruded with the inner layer. The method includes receiving, by an extrusion system, the adhesive silicone material as described above. In an embodiment, a cross-head die is used to allow extrusion of the adhesive layer over the adjacent inner layer.

The extrusion system for the adhesive layer typically includes a pumping system and can include a number of devices that can be utilized to form the adhesive layer of the composite tube. For example, the pumping system can include a pumping device such as a gear pump, a static mixer, an extruder, a tube die, a radiation cure device, a mixer, a post-processing device, or any combination thereof. Typically, the adhesive silicone material is mixed and pumped, i.e. extruded, through a tube die of the extrusion system. Any reasonable mixing apparatus is envisioned. In an embodiment, heat may also be applied to the adhesive silicone material. For instance, any reasonable heating temperature for the components of the adhesive silicone material may be used to provide a material that can flow from the pumping system and extruded through the die without degradation of the material. For instance, the temperature may be about 10° C. to about 70° C. It will be appreciated that the heating temperature can be within a range between any of the minimum and maximum values noted above.

In an embodiment, the adhesive silicone material is cured via radiation cure or thermal cure. In a particular embodiment, the radiation curing can occur while the adhesive silicone material flows through the pumping system, as the adhesive silicone material flows through the die, as the adhesive silicone material directly exits the die, or any combination thereof to form the adhesive layer. The radiation curing provides a continuous process of forming the adhesive layer. In an embodiment, the radiation curing of the adhesive silicone material can include subjecting the adhesive silicone material to one or more radiation sources. In a particular embodiment, the radiation source is sufficient to substantially cure the adhesive silicone material of the adhesive layer. "Substantially cure" as used herein refers to >90% of final crosslinking density, as determined for instance by rheometer data (90% cure means the material reaches 90% of the maximum torque as measured by ASTM D5289). For instance, the level of cure is to provide a desirable durometer for the adhesive layer of the composite tube. In an embodiment, the final durometer of the adhesive layer depends on the material chosen for the adhesive layer.

Any reasonable radiation source is envisioned such as actinic radiation. In an embodiment, the radiation source is ultraviolet light (UV). Any reasonable wavelength of ultraviolet light is envisioned. In a specific embodiment, the ultraviolet light is at a wavelength of about 10 nanometers to about 500 nanometers, such as about 10 nanometers to about 410 nanometers, such as a wavelength of about 200 nanometers to about 400 nanometers. Further, any number of applications of radiation energy may be applied with the same or different wavelengths. For example, the extrusion system can include one or more ovens (e.g. infrared (IR) ovens, air ovens), one or more baths (e.g. water baths), or a combination thereof, to cure the adhesive silicone material. The one or more IR ovens can operate at a particular peak wavelength. In certain instances, the peak wavelength of a first IR oven can be different from the peak wavelength of a second IR oven. In an embodiment, the adhesive silicone material can be subjected to a heat treatment for a specified period of time. In a particular embodiment, the adhesive silicone material can be subjected to curing in a first IR oven for a first period of time and then subject to curing in a second IR oven for a second period of time that is different from the first period of time. In one particular embodiment, use is made of a short wavelength IR oven. By short wavelength, it is meant that the peak wavelength is below 4 microns, typically below 3 microns, such as within a range of approximately 0.6 to 2.0 microns, such as 0.8 to 1.8 microns. Generally medium and longer wavelength IR ovens are characterized by a peak wavelength on the order of 4 to 8 microns, or even higher. It will be appreciated that the wavelength can be within a range between any of the minimum and maximum values noted above.

The process of forming the adhesive silicone material may include thermal treatment. Any temperature for thermal treatment is envisioned. In an embodiment, thermal treatment occurs at a temperature of about 100° C. to about 250° C., such as about 150° C. to about 250° C. In an embodiment, the thermal treatment occurs for a time period of greater than about 1 second, such as about 1 second to about 30 seconds, or even about 1 second to about 10 seconds. It will be appreciated that the thermal treatment temperature and time can be within a range between any of the minimum and maximum values noted above. In a particular embodiment, the thermal treatment is sufficient to substantially cure the adhesive silicone material of the adhesive layer. In an embodiment, the source of radiation and the thermal treatment may occur concurrently, in sequence, or any combination thereof. In a particular embodiment, the source of radiation and thermal treatment occurs concurrently.

Further, the outer layer is provided by any reasonable means such as extrusion or molding. In an embodiment, the outer layer is provided by extrusion, which may be the same or different than the extrusion system used for the adhesive layer. The extrusion system for the thermoplastic layer typically includes a pumping system and can include a number of devices that can be utilized to form the outer layer of the composite tube. For example, the pumping system can include a pumping device such as a gear pump, a static mixer, an extruder, a tube die, a radiation cure device, a post-processing device, or any combination thereof. In an exemplary embodiment, the thermoplastic polymer may be melt processed by dry blending or compounding. The dry blend may be in powder, granular, or pellet form. In a particular embodiment, to form the outer layer of the composite tube, pellets of the corresponding monomer or polymer may be compounded through a co-rotating intermeshing twin-screw extruder, cooled by a water bath, and cut into compound pellets. The outer layer may be made by a continuous compounding process or batch related process. In an embodiment, the resulting pellets of the blend are fed into an extruder with a tube die. The thermoplastic polymer having the functional group is extruded through the tube die to form the outer layer of the composite tube.

In an embodiment, the thermoplastic polymer is crosslinked. Any crosslinking conditions are envisioned, such as radiation crosslinking. In a particular embodiment, the radiation source is sufficient to substantially crosslink the thermoplastic polymer. In an embodiment, the radiation source crosslinks the functional group of the thermoplastic polymer to the adhesion promoter in the adhesive layer. Any reasonable radiation source is envisioned such as actinic radiation. In an embodiment, the radiation source is ultraviolet light (UV), electron beam (e-beam), gamma, or combination thereof. In a particular embodiment, crosslinking the thermoplastic polymer includes irradiating with ultraviolet energy with a wavelength of about 10 nanometers to about 500 nanometers, such as about 10 nanometers (nm) to about 410 nm. Further, any number of applications of radiation energy may be applied with the same or different wavelengths. For example, the extrusion system can include one or more ovens (e.g. infrared (IR) ovens, air ovens), one or more baths (e.g. salt water baths), or a combination thereof, to cure the thermoplastic polymer. The one or more IR ovens can operate at a particular peak wavelength. In certain instances, the peak wavelength of a first IR oven can be different from the peak wavelength of a second IR oven. In an embodiment, the thermoplastic polymer can be subjected to a heat treatment for a specified period of time. In a particular embodiment, the thermoplastic polymer can be subjected to crosslinking in a first IR oven for a first period of time and then subject to crosslinking in a second IR oven for a second period of time that is different from the first period of time. In one particular embodiment, use is made of a short wavelength IR oven. By short wavelength, it is meant that the peak wavelength is below 4 microns, typically below 3 microns, such as within a range of approximately 0.6 to 2.0 microns, such as 0.8 to 1.8 microns. Generally medium and longer wavelength IR ovens are characterized by a peak wavelength on the order of 4 to 8 microns, or even higher. It will be appreciated that the wavelength can be within a range between any of the minimum and maximum values noted above. Any gamma radiation source and dosage is envisioned. In an embodiment, the gamma radiation is via Cobalt-60 ($^{60}$Co) at a dose of about 10 kGy to about 200 kGy, such as about 20 kGy to about 100 kGy, such as about 50 kGy to about 100 kGy. It will be appreciated that the gamma radiation dose can be within a range between any of the minimum and maximum values noted above.

In a particular embodiment, the radiation crosslinking can occur while the thermoplastic polymer flows through the pumping system, as the thermoplastic polymer flows through the tube die, as the thermoplastic polymer directly exits the tube die, or any combination thereof to form the outer layer. The radiation crosslinking provides a continuous process of forming the outer layer.

Although the outer layer is described in this embodiment as being delivered after the adhesive layer is provided, any order of delivery of the polymeric components, the radiation source, or combination thereof is envisioned. In a particular embodiment, the adhesive silicone layer and the outer layer are co-extruded, with a radiation source applied to both the adhesive silicone layer and the outer layer simultaneously.

Once the adhesive layer and the outer layer are formed over the inner layer, the composite tubing can undergo one or more post processing operations. Any reasonable post processing operations are envisioned. For instance, the composite tubing can be subjected to any reasonable radiation source such as UV radiation, e-beam radiation, gamma radiation, and the like. Further, the composite tubing can be subjected to a post-cure heat treatment, such as a post-curing cycle. Post thermal treatment typically occurs at a temperature of about 40° C. to about 200° C. In an embodiment, the post thermal treatment is at a temperature of about 60° C. to about 100° C. Typically, the post thermal treatment occurs for a time period of about 5 minutes to about 10 hours, such as about 10 minutes to about 30 minutes, or alternatively about 1 hour to about 4 hours. It will be appreciated that the post thermal treatment temperature and time can be within a range between any of the minimum and maximum values noted above. In an alternative example, the composite tubing is not subjected to a post thermal treatment. In an example, the composite tubing can be cut into a number of composite tubes having a specified length. In another embodiment, the post processing can include wrapping the composite tube into a coil of tubing.

Any dimensions of the composite tube are envisioned. For instance, any thickness of the layers is envisioned and is typically dependent upon the final properties desired for the composite tube.

Figure 2:
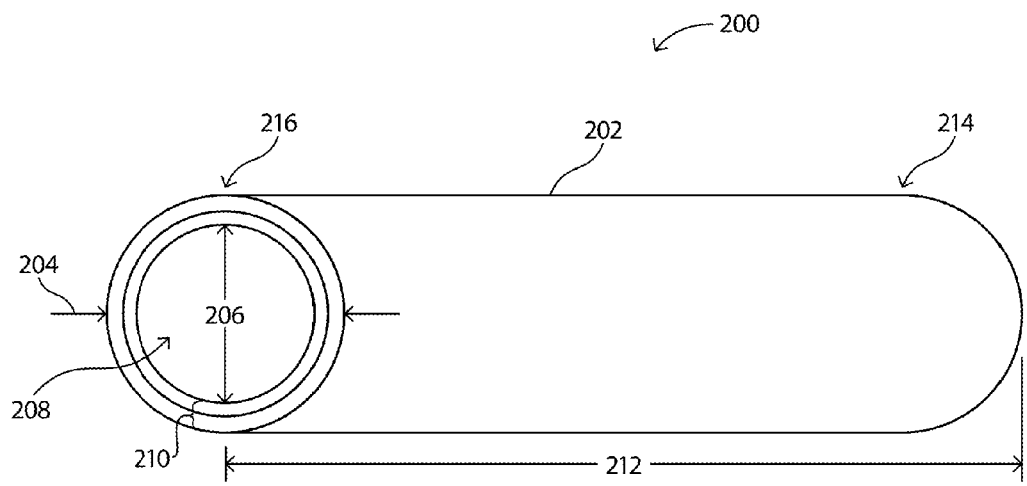
FIG. 2 is a view of a composite tube according to an embodiment.

As seen in FIG. 2, the composite tube 200 can include a body 202 having an outer diameter 204 and an inner diameter 206. The inner diameter 206 can form a hollow bore 208 of the body 202. In addition, the body 202 can include a wall thickness 210 that is measured by the difference between the outer diameter 204 and the inner diameter 206. Further, the body 202 can have a length 212.

In a particular embodiment, the outer diameter 204 can be any reasonable outside diameter envisioned for a composite tube. In a more particular embodiment, the outside diameter is dependent upon the application and the final properties desired. For instance, the outside diameter can be at least approximately 0.125 inch, at least approximately 0.25 inch, at least approximately 0.5 inch, or at least approximately 1.5 inch. Any reasonable upper limit is envisioned. It will be appreciated that the outer diameter 204 can be within a range below the minimum value noted above.

In another embodiment, the inner diameter 206 of the body 202 can be any reasonable inner diameter envisioned for a composite tube. In a more particular embodiment, the inner diameter 206 is dependent upon the application and the final properties desired. For instance, the inner diameter can be at least approximately 0.060 inch, at least approximately 0.125 inch, at least approximately 0.5 inch, or at least approximately 1.0 inch. Any reasonable upper limit is envisioned. It will be appreciated that the inner diameter 306 can be within a range below the minimum value noted above.

In a further embodiment, the length 212 of the body 202 can be any reasonable length envisioned for a composite tube. In a more particular embodiment, the length 112 can be at least approximately 2 meters (m), at least about 5 meters, at least about 10 meters, at least about 20 meters, at least about 30 meters, at least about 50 meters, or even about 100 meters. In another embodiment, the length 212 can be at least approximately 30 m, at least approximately 50 m, at least approximately 100 m, at least approximately 125 m, or at least approximately 300 m. The length 212 is generally limited by pragmatic concerns, such as storing and transporting long lengths, or by customer demand for limited production runs, such as 20 m or 100 m. In another embodiment, the length 212 can be at least approximately 30 m, at least approximately 50 m, at least approximately 100 m, or at least approximately 125 m.

Although the cross-section of the inner bore 208 perpendicular to an axial direction of the body 202 in the illustrative embodiment shown in FIG. 2 has a circular shape, the cross-section of the inner bore 208 perpendicular to the axial direction of the body 202 can have a square shape, a triangular shape, or a rectangular shape. It should also be noted that the composite tube 200 is free from any of the visual defects found on tubes formed by a molding process. For example, the composite tube 200 does not include any parting lines. Additionally, knit lines are absent from one or more ends of the body 202, such as a distal end 214, a proximal end 216, or both.

Once formed and cured, particular embodiments of the above-disclosed process advantageously exhibit desired properties such as increased productivity and an improved composite tube. In a particular embodiment, the extrusion and radiation of the adhesive silicone material and thermoplastic polymer having the functional group can form a composite tube that is not achieved by conventional manufacturing processes. In particular, the extrusion and radiation cure is conducive to forming composite tubes with an inner layer of a validated silicone polymer, an adhesive layer, and a thermoplastic material with improved properties over a traditional silicone tube consisting of a silicone material, such as a traditional silicone tube consisting of the silicone polymer described as the inner layer. In an embodiment, the traditional silicone tube is a platinum-cured high consistency rubber. The processing conditions provide a composite tube of a continuously extruded adhesive silicone material in direct contact with a continuously extruded thermoplastic material that further includes a validated silicone polymer as the fluid contact layer.

Furthermore, the radiation applied to the composite tube provides a final product with increased adhesion of the adhesive layer to the inner layer and the outer layer, compared to a composite tube that is conventionally heat cured. Although not being bound by theory, it is believed that the radiation may provide instant penetration of the radiation into at least the adhesive silicone material and curing of the at least adhesive silicone material concurrently. This radiation at least enhances the adhesive properties of the adhesive layer to the inner layer such that a cohesive bond is provided between the inner layer and the adhesive layer. In an further embodiment, it is believed that when applied to both the adhesive layer and the outer layer, the radiation provides instant penetration of the radiation into the adhesive silicone material, thermoplastic material, or combination thereof and curing of the adhesive silicone material concurrently. In an embodiment, the radiation provides crosslinking of the functional group of the thermoplastic polymer to the adhesion promoter of the adhesive silicone material such that a cohesive bond is provided between the outer layer and the adhesive layer. For instance, the inner layer, the adhesive layer, and the outer layer of the composite tube have a peel strength that exhibits cohesive failure, when tested in a parallel peel configuration at room temperature. In an embodiment, desirable adhesion may be achieved without a primer, a chemical surface treatment, a mechanical surface treatment, or any combination thereof between the inner layer and the adhesive layer as well as the adhesive layer and the outer layer. Furthermore, the radiation applied can provide a faster cure compared to conventional thermal cure.

Once formed and cured, particular embodiments of the above-disclosed composite tube advantageously exhibit desired properties such as oxygen permeation rate, chemical permeation rate, water permeation rate, chemical resistance, wettability, biocompatibility, reduced coefficient of friction at the outer diameter of the outer layer and reduced surface tack at the outer diameter of the outer layer. In particular, the composite tube has improved properties compared to a traditional silicone tube consisting of a silicone material. For instance, the composite tube has an oxygen permeation reduction of greater than about 50%, such as greater than about 60%, such as greater than about 70%, or even greater than about 80%, compared to a traditional silicone tube consisting of a silicone material. For instance, the composite tube has an oxygen permeation rate of less than about 20,000 cc-mm/(m$^2$-day-atm), less than about 15,000 cc-mm/(m$^2$-day-atm), less than about 10,000 cc-mm/(m$^2$-day-atm), or even less than about 5,000 cc-mm/(m$^2$-day-atm). In an embodiment, the composite tube has an improved chemical permeation rate and a chemical resistance compared to a traditional silicone tube consisting of a silicone material. In a particular embodiment, chemical resistance is demonstrated with a lower rate and amount of swell when the composite tube is exposed to a chemical. In another embodiment, the composite tube has an average reduction in water loss of greater than about 20%, such as greater than about 30%, such as greater than about 40%, or even greater than about 50%, compared to a traditional silicone tube consisting of a silicone material. In another embodiment, the composite tube has a water vapor transmission reduction rate of greater than about 20%, such as greater than about 25%, such as greater than about 30%, or even greater than about 35%, compared to a traditional silicone tube consisting of a silicone material.

In an embodiment, the composite tube can be sealed or welded. Typically, "sealing" refers to a flat seal that forms a terminus of a fluid conduit of the composite tube. Typically, "welding" refers to welding two portions of a composite tube together to form a circumferential seal for tubing applications that provides a fluid conduit between two ends of composite tubing. In a particular embodiment, at least the thermoplastic material of the outer layer is sealable or weldable. Any reasonable welding or sealing methods are envisioned.

Many industries utilize composite tubing in conjunction with an apparatus for the delivery and removal of fluids. Applications are numerous where, for example, a desirable oxygen permeation rate, chemical permeation rate, pump flow rate, pump life, and/or water vapor permeation rate are desired. Composite tubing may be used in conjunction with any reasonable apparatus. An exemplary apparatus is a medical device, a pharmaceutical device, a biopharmaceutical device, a chemical delivery device, a laboratory device, a water treatment device, a document printing device, a food and beverage device, an industrial cleaning device, an automotive device, an aerospace device, an electronics device, or a fuel delivery device. Further, although described primarily as a composite tube, any article, profile, or film is envisioned containing at least the inner layer including the silicone polymer, the adhesive silicone layer directly in contact with the inner layer, and the outer layer directly in contact with the adhesive silicone layer.

Figure 3:
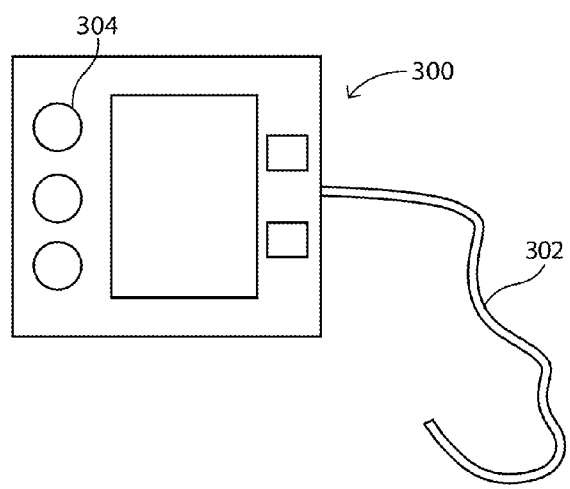
FIG. 3 is a diagram of an apparatus coupled to a composite tube according to an embodiment.

FIG. 3 is a diagram of an apparatus 300 coupled to a composite tube 302 according to an embodiment. The composite tube 302 can be formed from the composite tube 100 and 200 of FIGS. 1 and 2. In an embodiment, the apparatus 300 is a pharmaceutical device used to provide the fluid.

In an embodiment, the apparatus 300 can include a pump to dispense fluid via the composite tube 302. In an embodiment, the apparatus 300 can include a peristaltic pump, an infusion pump, an enteral feeding pump, or a combination thereof.

The composite tube can contribute to providing a specified amount of fluid. For example, one or more controls, such as the control 304, can be set to provide a specified flow rate of fluid. An amount of fluid can be dispensed that is within a particular tolerance in relation to the amount specified via the control 304.

In an exemplary embodiment, the composite tube has a desirable flow stability and increased lifetime. In an embodiment, the composite tube may have a pump life of greater than about 100 hours, such as greater than about 200 hours, or even greater than about 400 hours as measured by peristaltic pumping at 400 rpm and 0 psi backpressure. In an exemplary embodiment, the composite tube may have an average reduction in water loss of greater than about 20%, such as greater than about 30%, such as greater than about 40%, or even greater than about 50%, compared to a traditional silicone tube consisting of a silicone material.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the items as listed below.

Embodiment 1. A composite tube including an inner layer including a silicone polymer, wherein the inner layer has a surface that defines a central lumen of the composite tube; an adhesive layer adjacent to the inner layer, wherein the adhesive layer includes an adhesive silicone material including a silicone polymer and an adhesion promoter, and an outer layer adjacent to the adhesive layer, wherein the outer layer includes a thermoplastic polymer having a functional group that forms a chemical bond with the adhesion promoter of the silicone polymer.

Embodiment 2. A method of forming a composite tube, including providing an inner layer including a silicone polymer, wherein the inner layer has a surface that defines a central lumen of the composite tube; extruding an adhesive layer adjacent to the inner layer, wherein the adhesive layer includes an adhesive silicone material including a silicone polymer and an adhesion promoter; extruding an outer layer adjacent to the adhesive layer, wherein the outer layer includes a thermoplastic polymer having a functional group that forms a chemical bond with the adhesion promoter of the adhesive layer; and irradiating the adhesive layer and the outer layer with a radiation source to form the chemical bond between the functional group of the outer layer and the adhesion promoter of the adhesive layer.

Embodiment 3. The composite tube or method of forming the composite tube of embodiments 1 or 2, wherein the silicone polymer of the adhesive silicone material has a viscosity of less than about 2,000,000 centipoise prior to cure.

Embodiment 4. The composite tube or method of forming the composite tube of embodiments 1 or 2, wherein the silicone polymer of the adhesive silicone material includes a liquid silicone rubber (LSR) or a room temperature vulcanizing silicone (RTV).

Embodiment 5. The composite tube or method of forming the composite tube of embodiments 1 or 2, wherein the silicone polymer of the adhesive silicone material includes a catalyst.

Embodiment 6. The composite tube or method of forming the composite tube of embodiment 5, wherein the catalyst is platinum.

Embodiment 7. The composite tube or method of forming the composite tube of embodiments 1 or 2, wherein the adhesion promoter includes a siloxane or silane such as 3-methacryloxypropyltrimethoxysilane, 3-glycidoxypropyl-trimethoxysilane, vinyl-tris(2-methoxyethoxy)-silane; 2,5,7,10-tetraoxa-6-silaundecane, 6-ethenyl-6-(2-methoxy-ethoxy)-silane, a hydrogen phenyl silicone, a phenyl silane, or any combination thereof.

Embodiment 8. The composite tube or method of forming the composite tube of embodiments 1 or 2, wherein the thermoplastic polymer has an oxygen permeation rate of less than about 20,000 cc-mm/(m$^2$-day-atm).

Embodiment 9. The composite tube or method of forming the composite tube of embodiments 1 or 2, wherein the thermoplastic polymer is a polyester, a polyurethane, a nylon, a polyimide, a polyamide, a polyether, a polystyrene, an acrylonitrile butadiene styrene (ABS), a polybutylene terephthalate (PBT), a polyacrylic, an ethylene vinyl alcohol (EVOH), a polyolefin, an ethylene propylene diene elastomer, a copolymer, blend, or combination thereof.

Embodiment 10. The composite tube or method of forming the composite tube of embodiments 1 or 2, wherein the functional group comprises a hydroxide, a carbonyl, an alcohol, a carboxyl, a phenyl group, an amine, a diene, or combination thereof.

Embodiment 11. The composite tube or method of forming the composite tube of embodiments 1 or 2, wherein the outer layer further comprises a catalyst, a crosslink promoter, or combination thereof.

Embodiment 12. The composite tube or method of forming the composite tube of embodiments 1 or 2, wherein the functional group and the adhesion promoter form a cohesive bond.

Embodiment 13. The composite tube or method of forming the composite tube of embodiments 1 or 2, wherein silicone polymer of the inner layer includes a liquid silicone rubber, a high consistency rubber, or a room temperature vulcanizing silicone.

Embodiment 14. The composite tube or method of forming the composite tube of embodiments 1 or 2, wherein the inner layer is in direct contact with the adhesive layer.

Embodiment 15. The composite tube or method of forming the composite tube of embodiments 1 or 2, wherein the adhesive layer is in direct contact with the outer layer.

Embodiment 16. The method of forming the composite tube of embodiment 2, wherein the radiation source is ultraviolet energy with a wavelength of about 10 nanometers (nm) to about 410 nm.

Embodiment 17. The method of forming the composite tube of embodiment 2, wherein the radiation source substantially cures the adhesive silicone material.

Embodiment 18. The method of forming the composite tube of embodiment 2, wherein the radiation source substantially crosslinks the thermoplastic polymer.

Embodiment 19. The method of forming the composite tube of embodiment 2, wherein the adhesive layer and the outer layer are co-extruded.

Embodiment 20. The composite tube or method of forming the composite tube of embodiments 1 or 2, wherein the oxygen permeation of the composite tube is reduced by greater than about 50%, such as not greater than about 60%, such as not greater than about 70%, or even not greater than about 80%, compared to a traditional silicone tube.

Embodiment 21. The composite tube or method of forming the composite tube of embodiments 1 or 2, wherein the composite tube has a pump life of at least about 100 hours, such as at least about 200 hours, or even at least about 400 hours.

Embodiment 22. The composite tube or method of forming the composite tube of embodiments 1 or 2, wherein the composite tube has a water vapor transmission reduction rate of greater than about 20%, such as greater than about 25%, such as greater than about 30%, or even greater than about 35%, compared to a traditional silicone tube.

Embodiment 24. The composite tube or method of forming the composite tube of embodiments 1 or 2, wherein the composite tube is welded or sealed.

Embodiment 25. An apparatus including a composite tube according to embodiment 1, wherein the apparatus is a medical device, a pharmaceutical device, a biopharmaceutical device, a chemical delivery device, a laboratory device, a water treatment device, a food and beverage device, a document printing device, an industrial cleaning device, an automotive device, an aerospace device, an electronics device, or a fuel delivery device.

Embodiment 26. An apparatus, including a composite tube according to embodiment 1; and a pump coupled to the tube to dispense fluid contained in the tube.

Embodiment 27. The apparatus of embodiment 26, wherein the pump includes a pharmaceutical device to provide the fluid.

Embodiment 28. The apparatus of embodiments 26-27, wherein the pump is a peristaltic pump.

The concepts described herein will be further described in the following examples, which do not limit the scope of the disclosure described in the claims. The following examples are provided to better disclose and teach processes and compositions of the present invention. They are for illustrative purposes only, and it must be acknowledged that minor variations and changes can be made without materially affecting the spirit and scope of the invention as recited in the claims that follow.

EXAMPLES

Example 1

A prototype plaque of a composite structure is molded with a first layer of a UV cured high consistency rubber (HCR) and a second layer of a thermoplastic polyester. The composite plaque is molded using a compression molding press and cured via UV radiation with a wavelength of about 200 to 450 nm. The composite plaque has an overall thickness of 0.080". The thickness of the first UV cured silicone layer is 0.079" and the thickness of the top thermoplastic polyester layer is 0.001".

The composite plaque structure results in improved performance for water vapor transmission (WVTR) compared to a plaque made of traditional silicone. In the present example, "traditional silicone" is a thermally, cured platinum catalyzed high consistency rubber (HCR). A MOCON Permatran W700 WVTR analyzer is used to compare the WVTR of the composite plaque described above as well as the traditional silicone plaque. The test is run with the atmosphere on one side of the plaque at 37.8° C. and 100% relative humidity with an exposed test area of 50 cm$^2$. The test gas used is Nitrogen at a rate of 100 sccm for an overall exam cycle of 30 minutes. The average WTVR for the traditional silicone plaque is 48.7 g/(m$^2$-day) and the average WVTR for the composite plaque is 42.8 g/(m$^2$-day). This is approximately a 12% reduction in water loss through the plaque wall.

The composite plaque structure also resulted in improved performance for oxygen transmission (OTR) compared to a plaque made of traditional silicone. A MOCON Ox-tran 2/20 oxygen analyzer is used to compare the OTR of the composite plaque described above as well as the traditional silicone plaque. The test is run following ASTM D3985 with the atmosphere on one side of the plaque at 25° C. and an exposed test area of 5 cm$^2$. The test gas used is 10% Oxygen at a rate of 20 sccm for an overall exam cycle of 30 minutes. The carrier gas used is 4% H$_2$ and 96% N$_2$ at 0% RH. The average OTR for the traditional silicone plaque is 20800 cc/(m$^2$-day-atm) and the average OTR for the composite plaque is 2890 cc/(m$^2$-day-atm). This is approximately a 85% reduction in oxygen permeation through the composite plaque wall.

Example 2

A prototype plaque of a composite sandwich structure is first molded with a first layer of a thermal cured high consistency rubber (HCR) and a second layer of a composite of HCR and EPDM as the adhesive layer; second, the third layer of EPDM is overlaid under heated press. The composite sandwich structure plaque is molded using a compression molding press and cured at 350° F. for 3 min for the first step, and at 350° F. for 7 min for the second step. The composite plaque has an overall thickness of 0.071 inch. The thickness of the first thermal cured silicone layer is 0.022 inch, the thickness of silicone EPDM composite layer as the adhesive layer is 0.030 inch, and the thickness of EPDM layer is 0.019 inch. A silicone plaque is also molded as a control with a thickness of 0.061 inch.

The composite plaque structure results in improved performance for water vapor transmission (WVTR) compared to a plaque made of traditional silicone. In the present example, "traditional silicone" is a thermally, cured platinum catalyzed high consistency rubber (HCR), which has the same formulation used in the first layer of the sandwich plaque; a silicone EPDM composite is thermal cured, which had the same formulation used in the second layer of the sandwich plaque; a EPDM is thermal casted, which had the same formulation used in the third layer of the sandwich plaque. A MOCON Permatran W700 WVTR analyzer is used to compare the WVTR of the sandwich composite plaque described above as well as the traditional silicone plaque, silicone EPDM composite, and EPDM. The test is run with the atmosphere on one side of the plaque at 37.8° C. and 100% relative humidity with an exposed test area of 50 cm$^2$. The test gas used is Nitrogen at a rate of 100 sccm for an overall exam cycle of 30 minutes. The average WTVR for the traditional silicone plaque is 37.4 g/(m$^2$-day), the average WTVR for the silicone EPDM composite plaque is 9.6 g/(m$^2$-day), the average WTVR for the EPDM plaque is 1 g/(m$^2$-day), and the average WVTR for the sandwich composite plaque is 4.6 g/(m$^2$-day). The sandwich composite plaque has approximately an 88% reduction in water loss through the plaque wall compared to the traditional silicone plaque. (Note, 100% means the film is completely non-permeable).

The bonding force between the first silicone layer and third EPDM layer was about 5.6 ppi before post-crosslinking using E-beam or gamma, and adhesive failure is observed. After gamma radiation of Cobalt-60 at 50 kGy, the bonding force between the first silicone layer and third EPDM layer was improved to 8.1 ppi and cohesive failure is observed.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A composite tube comprising:
   an inner layer comprising a silicone polymer, wherein the inner layer has a surface that defines a central lumen of the composite tube;
   an adhesive layer adjacent to the inner layer, wherein the adhesive layer comprises an adhesive silicone material comprising a silicone polymer and an adhesion promoter, and
   an outer layer adjacent to the adhesive layer, wherein the outer layer comprises a thermoplastic polymer and a crosslink promoter, wherein the thermoplastic polymer has a functional group that forms a chemical bond with the adhesion promoter of the silicone polymer.

2. The composite tube of claim 1, wherein the silicone polymer of the adhesive silicone material has a viscosity of less than about 2,000,000 centipoise prior to cure.

3. The composite tube of claim 1, wherein the silicone polymer of the adhesive silicone material comprises a liquid silicone rubber (LSR) or a room temperature vulcanizing silicone (RTV).

4. The composite tube of claim 1, wherein the silicone polymer of the adhesive silicone material includes a catalyst.

5. The composite tube of claim 1, wherein the adhesion promoter comprises a siloxane or silane such as 3-methacryloxypropyltrimethoxysilane, 3-glycidoxypropyltrimethoxysilane, vinyl-tris(2-methoxyethoxy)-silane; 2,5,7,10-tetraoxa-6-silaundecane, 6-ethenyl-6-(2-methoxyethoxy)-silane, a hydrogen phenyl silicone, a phenyl silane, or any combination thereof.

6. The composite tube of claim 1, wherein the thermoplastic polymer has an oxygen permeation rate of less than about 20,000 cc-mm/(m$^2$-day-atm).

7. The composite tube of claim 1, wherein the thermoplastic polymer is a polyester, a polyurethane, a nylon, a polyimide, a polyamide, a polyether, a polystyrene, an acrylonitrile butadiene styrene (ABS), a polybutylene terephthalate (PBT), a polyacrylic, an ethylene vinyl alcohol (EVOH), a polyolefin, an ethylene propylene diene elastomer, a copolymer, blend, or combination thereof.

8. The composite tube of claim 1, wherein the functional group comprises a hydroxide, a carbonyl, an alcohol, a carboxyl, a phenyl group, an amine, a diene, or combination thereof.

9. The composite tube of claim 1, wherein the outer layer further comprises a catalyst.

10. The composite tube of claim 1, wherein the functional group and the adhesion promoter form a cohesive bond.

11. The composite tube of claim 1, wherein silicone polymer of the inner layer comprises a liquid silicone rubber, a high consistency rubber, or a room temperature vulcanizing silicone.

12. An apparatus comprising a composite tube according to claim 1, wherein the apparatus is a medical device, a pharmaceutical device, a biopharmaceutical device, a chemical delivery device, a laboratory device, a water treatment device, a food and beverage device, a document printing device, an industrial cleaning device, an automotive device, an aerospace device, an electronics device, or a fuel delivery device.

13. A method of forming a composite tube comprising:
providing an inner layer comprising a silicone polymer, wherein the inner layer has a surface that defines a central lumen of the composite tube;
extruding an adhesive layer adjacent to the inner layer, wherein the adhesive layer comprises an adhesive silicone material comprising a silicone polymer and an adhesion promoter;
extruding an outer layer adjacent to the adhesive layer, wherein the outer layer comprises a thermoplastic polymer and a crosslink promoter, wherein the thermoplastic polymer has a functional group that forms a chemical bond with the adhesion promoter of the adhesive layer; and
irradiating the adhesive layer and the outer layer with a radiation source to form the chemical bond between the functional group of the outer layer and the adhesion promoter of the adhesive layer.

14. The method of forming the composite tube of claim 13, wherein the silicone polymer of the adhesive silicone material has a viscosity of less than about 2,000,000 centipoise prior to cure.

15. The method of forming the composite tube of claim 13, wherein the thermoplastic polymer is a polyester, a polyurethane, a nylon, a polyimide, a polyamide, a polyether, a polystyrene, an acrylonitrile butadiene styrene (ABS), a polybutylene terephthalate (PBT), a polyacrylic, an ethylene vinyl alcohol (EVOH), a polyolefin, an ethylene propylene diene elastomer, a copolymer, blend, or combination thereof.

16. The method of forming the composite tube of claim 13, wherein the functional group comprises a hydroxide, a carbonyl, an alcohol, a carboxyl, a phenyl group, an amine, a diene, or combination thereof.

17. The method of forming the composite tube of claim 13, wherein the outer layer further comprises a catalyst.

18. The method of forming the composite tube of claim 13, wherein silicone polymer of the inner layer comprises a liquid silicone rubber, a high consistency rubber, or a room temperature vulcanizing silicone.

19. The method of forming the composite tube of claim 13, wherein the radiation source substantially cures the adhesive silicone material.

20. The method of forming the composite tube of claim 13, wherein the radiation source substantially crosslinks the thermoplastic polymer.

* * * * *